United States Patent
Levijoki et al.

(10) Patent No.: US 8,869,607 B2
(45) Date of Patent: Oct. 28, 2014

(54) EXHAUST DIAGNOSTIC SYSTEM AND METHOD WITH SCR NH3 DEPLETION CLEANSING MODE FOR INITIAL STEP IN THE DEF QUALITY SERVICE HEALING TEST

(75) Inventors: Stephen Paul Levijoki, Swartz Creek, MI (US); Brett B. Thompson, Farmington Hills, MI (US); Justin A. Shetney, Livonia, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 13/546,338

(22) Filed: Jul. 11, 2012

(65) Prior Publication Data

US 2013/0014575 A1    Jan. 17, 2013

Related U.S. Application Data

(60) Provisional application No. 61/507,195, filed on Jul. 13, 2011.

(51) Int. Cl.

| | |
|---|---|
| *G01M 15/10* | (2006.01) |
| *F02D 41/14* | (2006.01) |
| *F01N 3/20* | (2006.01) |
| *F01N 13/00* | (2010.01) |
| *F01N 11/00* | (2006.01) |
| *F02D 41/02* | (2006.01) |
| *F01N 3/035* | (2006.01) |
| *F01N 3/10* | (2006.01) |

(52) U.S. Cl.
CPC ............ *F01N 3/208* (2013.01); *F02D 41/1446* (2013.01); *F01N 13/009* (2013.01); *F02D 41/0235* (2013.01); *F01N 2560/14* (2013.01); *F02D 2200/0802* (2013.01); *F01N 2900/1602* (2013.01); *F02D 41/1463* (2013.01); *Y02T 10/24* (2013.01); *F01N 2560/06* (2013.01); *F01N 3/035* (2013.01); *Y02T 10/47* (2013.01); *F01N 11/002* (2013.01); *F01N 3/106* (2013.01); *F01N 2550/02* (2013.01)

USPC ....................................................... 73/114.75

(58) Field of Classification Search
USPC ......................................... 73/114.69, 114.75
See application file for complete search history.

(56) References Cited

U.S. PATENT DOCUMENTS 8,156,734 B2    4/2012  Haeberer et al.
8,286,419 B2 *  10/2012 Levijoki et al. .................. 60/295

(Continued)

FOREIGN PATENT DOCUMENTS

| CN | 102022169 A | 4/2011 |
|---|---|---|
| DE | 10043798 A1 | 3/2002 |

(Continued)

OTHER PUBLICATIONS

German Office Action for Application No. 10 2012 212 220.6 dated Nov. 8, 2013; 6 pages.

(Continued)

*Primary Examiner* — Eric S McCall
(74) *Attorney, Agent, or Firm* — Cantor Colburn LLP

(57) ABSTRACT

An exhaust diagnostic system comprises a selective catalyst reduction (SCR) component testing module, an exhaust stream temperature management module, and a test enabling module. The component testing module executes an SCR component efficiency test. The exhaust stream temperature management module adjusts a temperature of the SCR component to a predetermined temperature range. The test enabling module executes a process for depleting a reductant load and subsequently initiates an SCR component efficiency test while the temperature of the SCR catalyst is within the predetermined temperature range. A method for diagnosing an exhaust system comprises determining an efficiency of an SCR component and selectively adjusting a temperature of the SCR component to a predetermined temperature range. The method also includes executing a process for depleting a reductant load and initiating an SCR component efficiency test while the temperature of the SCR component is within the predetermined temperature range.

20 Claims, 3 Drawing Sheets

(56) References Cited

U.S. PATENT DOCUMENTS

| | | | |
|---|---|---|---|
| 8,353,202 B2* | 1/2013 | Thompson et al. | 73/114.75 |
| 2010/0154386 A1 | 6/2010 | Perrin et al. | |
| 2010/0218484 A1 | 9/2010 | Arlt et al. | |
| 2011/0023456 A1* | 2/2011 | Levijoki et al. | 60/274 |
| 2011/0023591 A1* | 2/2011 | Dobson et al. | 73/114.75 |
| 2011/0061363 A1* | 3/2011 | Levijoki et al. | 60/273 |
| 2011/0061372 A1* | 3/2011 | Levijoki et al. | 60/286 |
| 2011/0296905 A1* | 12/2011 | Bastoreala et al. | 73/114.75 |
| 2012/0041596 A1* | 2/2012 | Thompson et al. | 700/271 |
| 2012/0085082 A1* | 4/2012 | Levijoki et al. | 60/274 |
| 2013/0104637 A1* | 5/2013 | Kowalkowski et al. | 73/114.71 |

FOREIGN PATENT DOCUMENTS

| | | |
|---|---|---|
| DE | 102006041135 A1 | 3/2007 |
| DE | 102006056857 A1 | 6/2007 |
| DE | 102006053485 A1 | 5/2008 |
| DE | 102010016428 A1 | 10/2010 |
| DE | 102010036153 A1 | 3/2011 |

OTHER PUBLICATIONS

Chinese Office Action for Application No. 201210346683.7 dated Apr. 1, 2014; 9 pages.

German Office Action for Application No. 102012212220.6 dated Jul. 2, 2014; 5 pages.

* cited by examiner

EXHAUST DIAGNOSTIC SYSTEM AND METHOD WITH SCR NH3 DEPLETION CLEANSING MODE FOR INITIAL STEP IN THE DEF QUALITY SERVICE HEALING TEST

CROSS-REFERENCE TO RELATED APPLICATION

The present patent application claims the benefit of priority from U.S. provisional patent application No. 61/507,195 filed on Jul. 13, 2011, which is incorporated herein by reference in its entirety

FIELD OF THE INVENTION

The subject invention relates to vehicle exhaust systems, and more particularly to exhaust diagnostic systems and methods that evaluate performance of selective catalyst reduction (SCR) components and processes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion in a diesel engine, an air/fuel mixture is delivered through an intake valve to cylinders and is compressed and combusted therein. After combustion, the piston forces the exhaust gas (i.e., the exhaust stream) to flow from the cylinders through an exhaust system, from which the exhaust stream is released to the atmosphere. The exhaust stream may contain oxides of nitrogen (NOx) and carbon monoxide (CO).

Exhaust stream treatment systems may employ catalysts in one or more components configured for accomplishing an SCR process such as reducing nitrogen oxides (NOx) to produce more tolerable exhaust constituents of nitrogen (N2) and water (H2O). Reductant may be added to the exhaust stream upstream from an SCR, and, for example only, the reductant may include anhydrous ammonia (NH3), aqueous ammonia or urea, any or all of which may be injected as a fine mist into the exhaust stream. When the ammonia, mixed with the other constituents of the exhaust stream, reaches the SCR component, the NOx emissions within the exhaust stream are broken down. A Diesel Particulate Filter (DPF) may then capture soot, and that soot may be periodically incinerated during regeneration cycles. Water vapor, nitrogen and reduced emissions exit the exhaust system.

To maintain efficient NOx reduction in the SCR component, a control may be employed so as to maintain a desired quantity of the reductant (i.e., reductant load) in the SCR component. As the exhaust stream, containing NOx, passes through the SCR component, the reductant is consumed, and the load is depleted. A model may be employed by the control to track and/or predict how much reductant is loaded in the SCR component and to maintain an appropriate reductant load for achieving a desired effect such as reduction of NOx in the exhaust stream.

Exhaust systems with SCR components may be vulnerable to poor quality reductant. If a reductant tank has been filled with poor quality reductant, an exhaust diagnostic system may detect an unacceptable level of performance for the SCR component, such as a low NOx reduction efficiency. In response to detection of such a condition, the engine control modules in some vehicles may impose limits on the speed of the vehicle and/or initiate other remedial actions. For example, if acceptable reductant is not added soon after detection of a low SCR conversion efficiency, some controls may limit vehicle speed, e.g., to 55 mph and ultimately to 4 mph, in accordance with government requirements. To avoid imposition of these or other measures, a supply of high quality reductant should be maintained, and, if poor quality reductant is detected, it should promptly be replaced with higher quality reductant.

Testing the SCR efficiency is usually performed at SCR temperatures such as, for example, at 250 degrees C. or hotter. During speed limitation, however, the temperature range of the exhaust stream may be, for example only, less than 250 degrees C. Thus, after a vehicle has been speed limited and/or other remedial action has been taken, the remedial measures may prevent sufficient heat from being generated in the exhaust stream to accurately evaluate the SCR conversion efficiency. In this way, the imposition of remedial measures may interfere with the ability to verify whether the reductant has been replaced. Unfortunately, without an evaluation of the SCR conversion efficiency, no acceptable method currently exists to reset the exhaust diagnostic system after the speed of the vehicle has been limited following detection of poor reductant quality and/or low SCR conversion efficiency.

Some have attempted to avoid this problem by resetting the exhaust diagnostic system using a scan tool, e.g., at a service shop. This solution is unfavorable, however, due to the ready availability of scan tools to the general public, enabling some vehicle operators to inappropriately reset the exhaust diagnostic system to circumvent the purpose behind the measures and thereby enable use of ineffective reductants such as water. As a result, in some cases, no mechanism is provided for resetting the system via a scan tool. Moreover, many customers lack access to a scan tool. For these customers, a visit to an authorized service shop may be required anyway to enable the service shop to perform a service test to determine whether reductant of suitable quality has been replenished. Nonetheless, even where reductant quality can reliably be determined, when a vehicle has encountered a NOx efficiency issue, the model employed by the control to track and/or predict how much reductant is loaded in the SCR component may be susceptible to inaccuracies.

Accordingly, it is desirable to provide a system and method for predicting a quantity of reductant (i.e., the reductant load) present on SCR components and for testing the efficiency at which NOx are reduced in such SCR components with improved reliability following detection of poor reductant quality and/or low SCR conversion efficiency.

SUMMARY OF THE INVENTION

In one exemplary embodiment of the invention, an exhaust diagnostic system comprises a selective catalyst reduction (SCR) component testing module, an exhaust stream temperature management module, and a test enabling module. The component testing module executes an SCR component efficiency test comprising determining an efficiency of an SCR component. The exhaust stream temperature management module selectively adjusts a temperature of the SCR component to a predetermined temperature range using intrusive exhaust stream temperature management. The test enabling module executes a process for depleting a reductant load and subsequently initiates an SCR component efficiency test using the SCR component testing module after failing a prior SCR component efficiency test and while the temperature of the SCR catalyst is within the predetermined temperature range.

In another exemplary embodiment of the invention, a method for diagnosing an exhaust system comprises determining an efficiency of a selective catalyst reduction (SCR) component and selectively adjusting a temperature of the SCR component to a predetermined temperature range using intrusive exhaust stream temperature management. The method also includes executing a process for depleting a reductant load and initiating an SCR component efficiency test using the SCR efficiency module after failing a prior SCR component efficiency test and while the temperature of the SCR component is within the predetermined temperature range.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
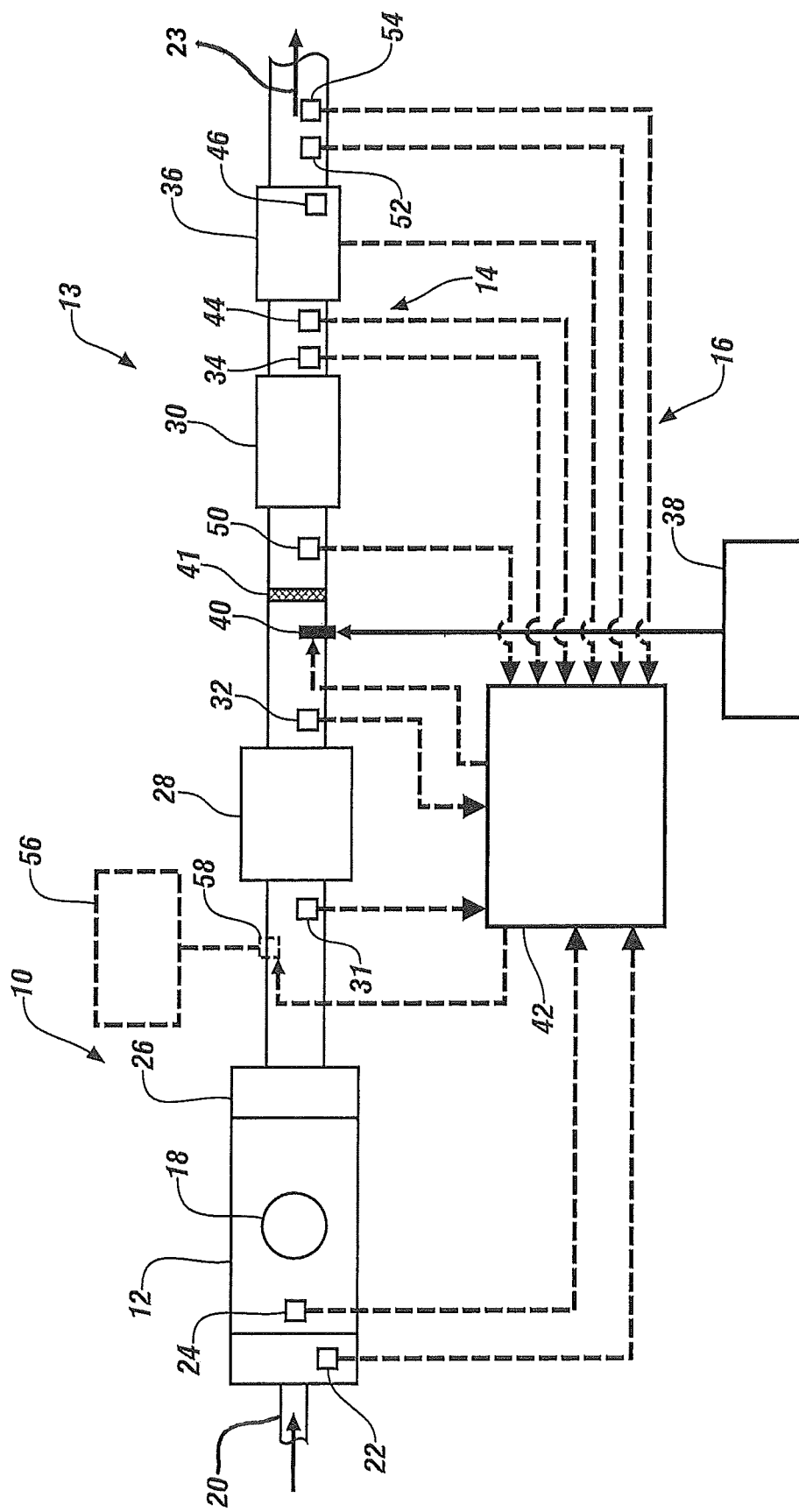
FIG. 1 is a functional block diagram of an engine control system including an exhaust diagnostic system that automatically resets after operating with poor diesel reductant quality according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure involves diesel engines, other types of engines such as gasoline engines, including direct injection engines, may benefit from the teachings herein.

In accordance with an exemplary embodiment of the invention, the present disclosure provides a system and method for automatically (or via an intrusive service test that may be initiated by a service test tool) resetting an exhaust diagnostic system of a vehicle after an SCR component has been operated with a reductant of inadequate quality, vehicle speed has been limited, and/or other remedial action has been taken. To improve the accuracy and/or reliability of reductant load predictions, a service procedure begins by re-calibrating the model responsible for creating those predictions. The service procedure accomplishes the calibration by establishing a known reductant load in or on the SCR component. In some embodiments, the service procedure achieves the calibration by executing a service regeneration test that is effective to reliably consume any reductant load in the SCR component.

Thus, upon the occurrence of criteria indicating that a sufficiently substantial risk exists that an actual reductant load in an SCR component fails to match a load predicted by a load model, such as may occur following detection of poor urea quality, an actual and reliably knowable reductant load is re-established in the SCR component, resulting in improved model accuracy. More specifically, after the service regeneration test, and provided that injector cooling via continuing injection of reductant has not occurred, the reductant load can reliably be assumed to be within an acceptable tolerance of a known level, e.g., zero. With the reductant load established, the model may be calibrated or otherwise re-set so that its prediction for reductant load matches the known level. With the model having been calibrated, a service healing test can be executed with improved accuracy and reliability.

More specifically, prior to execution of a service healing test, the reductant load on the SCR component is intentionally depleted using reliable means such as execution of a regeneration test procedure, so that the reductant load may reliably be at or below a pre-established threshold. This reductant-depleting, SCR-cleansing process may be performed as an initial step in the DEF quality service healing test. In a non-limiting exemplary embodiment, a cleansing process for an SCR component includes commanding dosing off, at the beginning of the service healing test, until the load of NH3 or another reductant has been sufficiently depleted from the SCR component to a level below a predetermined threshold. An algorithm may be employed to evaluate the degree to which NOx are reduced in the SCR component so as to verify the extent to which reductant has been depleted. The sufficient depletion of reductant can be confirmed by comparing information signals produced by the upstream and downstream NOx sensors so as to verify that any detectable difference between their outputs is within an acceptable level. In addition, or in the alternative, an algorithm based on empirical experience may be used to determine the extent of the depletion. For example, for a particular system, operation of the system may have been sufficiently characterized that rates of reductant consumption may be understood for certain operating conditions. Accordingly, the procedure provides assurance that the load of reductant is at a known level. After the NH3 load has been depleted, normal dosing can be commenced to re-establish a known (i.e., reliably predictable by the NH3 load model) NH3 load on the NOx catalyst.

As described above, the exhaust diagnostic system according to the present disclosure first depletes the reductant load on the SCR component until the load is below a preset threshold. This may be accomplished by commanding, or maintaining, dosing of reductant at a level below a predetermined level until the reductant load has been sufficiently depleted from the SCR component. This predetermined level may be completely off, as described above, or may be set at one or more levels configured to result in depletion of reductant on the SCR such as at levels less than the rate at which reductant is consumed in the SCR. It should be noted that it may be impractical to command dosing to be completely off. For example, in some situations, it is necessary to dose the exhaust stream with reductant so as to cool the reductant injection nozzles.

Once the reductant has been sufficiently depleted, a condition that may be verified by an indication from the NOx sensors and/or from the model-predicted consumption of reductant in the SCR, the load of reductant will be at a reliably-knowable level, at or near zero.

The sufficient depletion of reductant has been confirmed, such as by comparing information signals produced by the upstream and downstream NOx sensors and verifying that any detectable difference between their outputs is within an acceptable level and/or by observing an indication from the load model that the SCR component is unloaded. The reductant load may reliably be considered to have been depleted, and normal dosing can be commenced to re-establish a known (i.e., reliably predictable by the reductant load model) load of reductant on the SCR catalyst.

In connection with the above steps, and/or following completion of the NH3 depletion and resumption of normal dosing, the exhaust diagnostic system according to the present disclosure may elevate the exhaust temperature using intrusive exhaust stream temperature management so that a temperature of the SCR catalyst is high enough to allow testing of the efficiency of the SCR catalyst. If the SCR efficiency is above a predetermined threshold, limitations on the vehicle speed and/or other remedial actions can be removed without requiring a scan tool. In other words, the exhaust system diagnostic can self-heal (or via an intrusive service test which is initiated by the service test tool) after failing the SCR component efficiency test due to poor quality reductant.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

The exhaust stream 23 is produced inside the cylinder 18 as a result of the combustion process. The exhaust system 14 treats the exhaust stream 23 before the exhaust stream 23 is released to atmosphere. The exhaust system 14 includes an exhaust manifold 26 and a diesel oxidation catalyst (DOC) 28. The exhaust manifold 26 directs exhaust stream exiting the cylinder through the DOC 28. The exhaust stream is treated within the DOC 28 to reduce the regulated emissions. The exhaust system 14 further includes an SCR component 30, an exhaust system upstream temperature sensor 31, an SCR component inlet temperature sensor 32, an SCR component outlet temperature sensor 34 and a particulate filter (PF) 36.

The exhaust system upstream temperature sensor 31 may be positioned between the engine and the DOC 28. The SCR component inlet temperature sensor 32 is located upstream from the SCR component 30 to monitor the temperature change at the inlet of the SCR component 30. The SCR component outlet temperature sensor 34 is located downstream from the SCR component 30 to monitor the temperature change at the outlet of the SCR component 30. Although the exhaust treatment system 13 is illustrated as including the SCR component inlet temperature sensor 32 and the SCR component outlet temperature sensor 34, both being arranged outside the SCR component 30, the inlet and outlet temperature sensors 32, 34 can be located inside the SCR component 30 while being configured and arranged so as to monitor the temperature (i.e., enthalpy) change of the exhaust stream at the inlet and outlet of the SCR component 30. The PF 36 further reduces emissions by trapping particulates (e.g., soot and other material) in the exhaust stream.

The dosing system 16 includes a dosing injector 40 that injects reductant from a reductant supply 38 into the exhaust stream. The reductant mixes with the exhaust stream 23 and further reduces the emissions when the mixture is exposed to the SCR component 30. A mixer 41 may be used to mix the reductant with the exhaust stream 23 upstream from the SCR component 30. A control module 42 regulates and controls the operation of the engine system 10.

An exhaust stream flow rate sensor 44 may generate a signal corresponding to the flow rate of exhaust stream in the exhaust system 14. Although the sensor is illustrated between the SCR component 30 and the PF 36, various other locations within the exhaust system 14 may be used for measurement including downstream from the exhaust manifold 26 and upstream from the SCR component 30.

A particulate filter temperature sensor 46 generates a particulate filter temperature signal corresponding to a measured particulate filter temperature. The particulate filter temperature sensor 46 may be disposed on or within the PF 36. The particulate filter temperature sensor 46 may also be located upstream or downstream from the PF 36.

Other sensors in the exhaust system 14 may include an upstream NOx sensor 50 that generates a NOx signal based on a concentration of NOx present in the exhaust system 14. A downstream NOx sensor 52 may be positioned downstream from the PF 36 to measure a concentration of NOx leaving the PF 36. In addition, an ammonia (NH3) sensor 54 generates a signal corresponding to the amount of ammonia within the exhaust stream. The NH3 sensor 54 is optional, but can be used to simplify the control system due to the ability to discern between NOx and NH3. Alternately and/or in addition, a hydrocarbon (HC) supply 56 and a HC injector 58 may be provided to supply HC in the exhaust stream 23 reaching the DOC 28.

Figure 2:
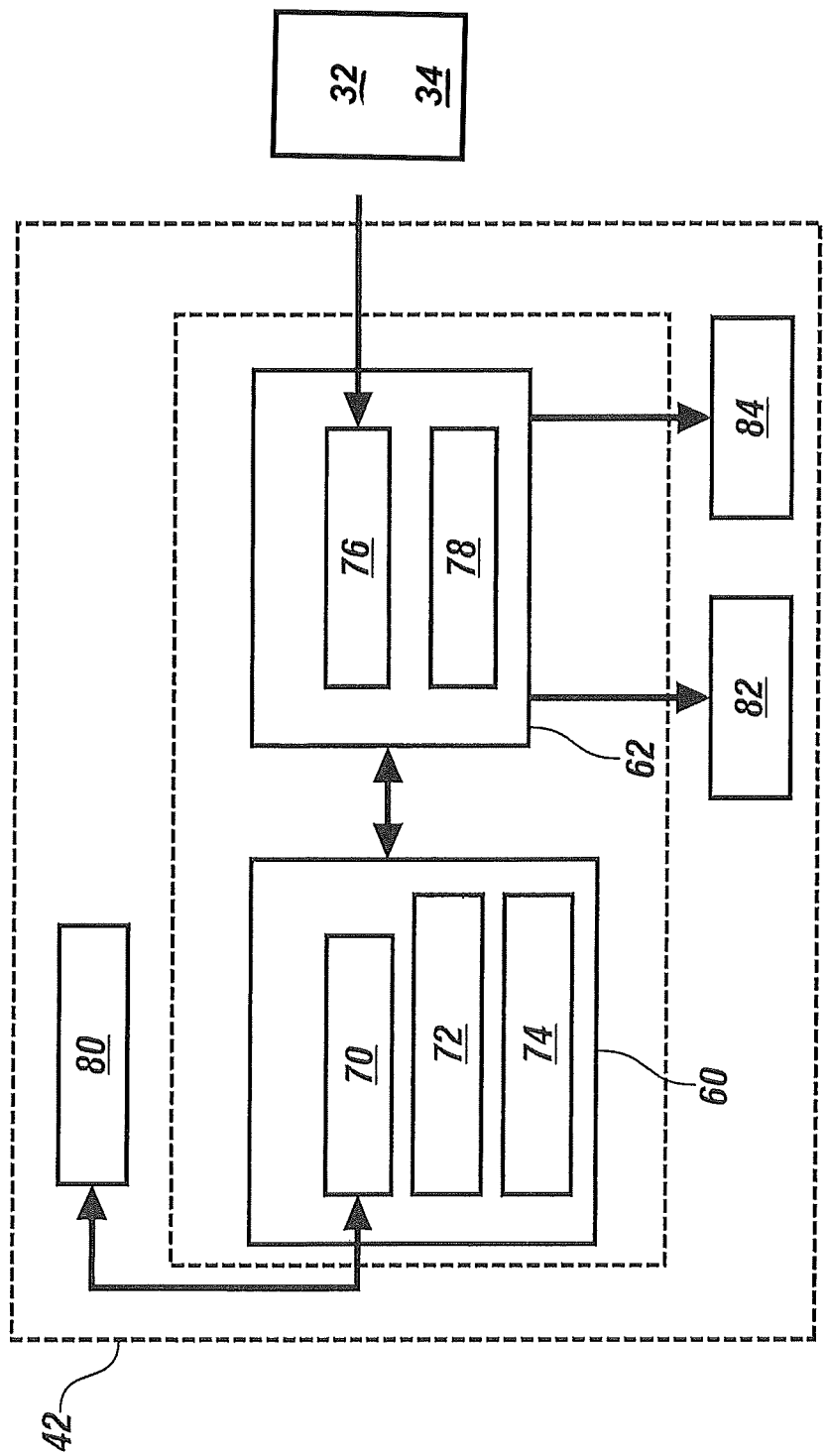
FIG. 2 is a functional block diagram of an exemplary implementation of a control module of the exhaust diagnostic system of FIG. 1.

Referring now to FIG. 2, the control module 42 may include an SCR component testing module 60 that is used to determine a conversion efficiency of NOx at the SCR component 30. The control module 42 further includes an exhaust stream temperature management module 62 that intrusively controls a temperature of the SCR component 30.

The SCR component testing module 60 includes a reset module 70 and a test initiation module 72. As used herein, the term intrusive means that the control module 42 varies the control of the engine outside of the operating conditions to allow the test to occur. The test initiation module 72 initiates an intrusive SCR component efficiency test after the SCR component 30 fails a prior SCR component efficiency test, and vehicle speed limiting and/or other remedial action is taken.

The intrusive test initiation module 72 sends a signal to the exhaust stream temperature management module 62 to initiate intrusive temperature control of the SCR component prior to an SCR component efficiency test. The test enabling module 74 ensures that enable conditions are met prior to testing.

The exhaust stream temperature management module 62 includes an SCR component temperature calculating module 76 that calculates a temperature of the SCR component. The temperature calculating module 76 may calculate the temperature of the SCR component based on the SCR component inlet temperature sensor 32, the SCR component outlet temperature sensor 34, a model or any other suitable method. For example only, the temperature calculating module 76 may calculate the SCR component temperature based on values from both the inlet and outlet temperature sensors 32, 34. For example only, the temperature calculating module 76 may calculate the temperature based on an average or a weighted average of the inlet and outlet temperature sensors 32, 34.

The control module 42, the SCR component testing module 60 and/or the exhaust stream temperature management module 62 may include an operating parameter adjustment module 78 that adjusts other operating parameters prior to the intrusive SCR component efficiency test. For example, other operating parameters such as dosing, reductant load, EGR, and/or other conditions may also be adjusted within corresponding windows prior to the intrusive SCR component efficiency test.

The control module 42 includes a vehicle speed limiting module 80 that limits vehicle speed after the SCR component efficiency falls below a predetermined threshold. The control module 42 further includes a fueling control module 82 that determines fuel quantity, fuel injection timing, post injection, etc. When in the intrusive SCR component test mode, the exhaust stream temperature management module 62 adjusts fueling. The fueling adjustment increases a temperature of the SCR component. Alternately, a hydrocarbon injection module 84 injects fuel into the exhaust stream upstream from the DOC 28 to generate an exotherm to increase the temperature in the SCR component.

Figure 3:
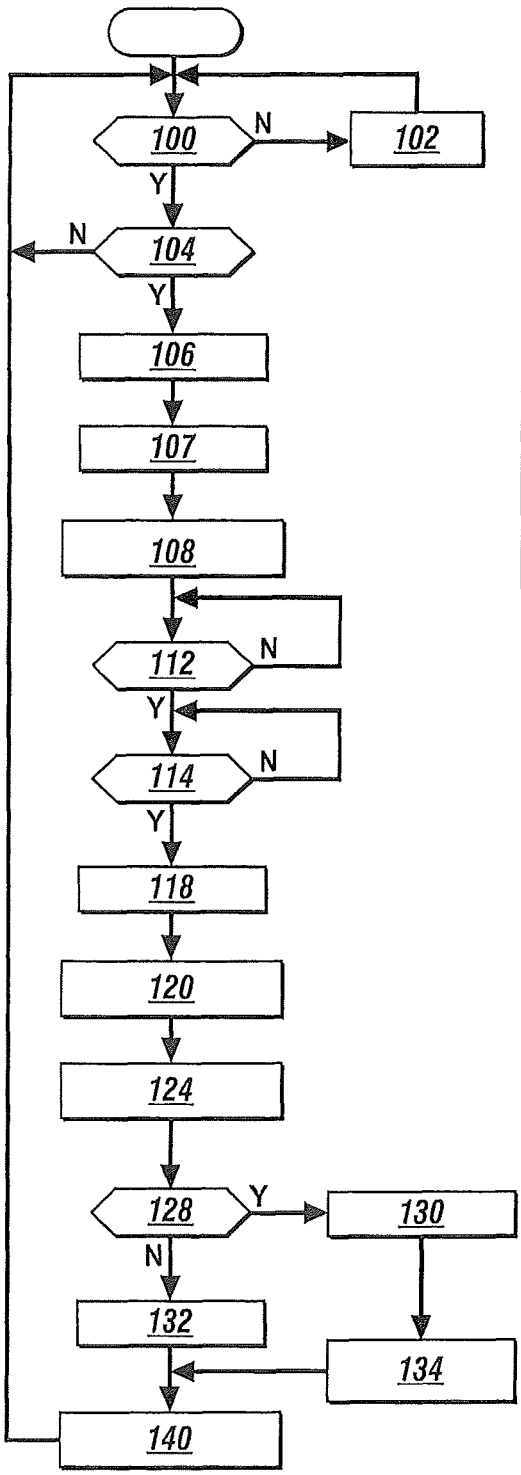
FIG. 3 illustrates a method for resetting an exhaust diagnostic system after operating with poor diesel reductant quality according to the present disclosure.

Referring now to FIG. 3, control begins at 100 where control determines whether an intrusive reductant quality test needs to be executed. For example only, the intrusive reductant quality test is executed after the vehicle is placed in a speed-limited mode and/or other remedial action is taken following a failure to pass a prior SCR component efficiency test.

If 100 is false, control runs in a normal mode at 102. If 100 is true, control continues at 104 and determines whether a first set of conditions are acceptable to run the test. For example only, the first set of conditions may include ensuring that regeneration of the PF 36 is not being performed. PF regeneration is typically performed when soot builds up in the PF 36. Additionally, the first set of conditions may include ensuring that adaptation is not being performed. Adaptation occurs when there is a problem with the SCR component such that a difference between a downstream NOx sensor measurement and an expected NOx level based on a model exceeds a predetermined tolerance level. Still other conditions may be used in the first set of conditions instead of, or in addition to, these conditions.

If 104 is false, control returns to 100. If 104 is true, control continues at 106 and optionally disables exhaust stream recirculation (EGR). At 107, control activates a process for depleting a reductant load to establish a reliable reductant load on the SCR component. The process for depleting a reductant load includes commanding dosing at a reduced level (e.g., off) until the reductant load has been sufficiently depleted from the SCR component (i.e., the algorithm determines that the reductant load on the SCR component has been depleted to a level less than a predetermined threshold). Optionally, a regeneration test may be initiated so as to more quickly deplete the reductant load. The sufficient depletion of reductant can be confirmed by comparing information signals produced by the upstream and downstream NOx sensors so as to verify that any detectable difference between their outputs is within an acceptable level. In addition, the load model can be observed so as to ensure that it indicates that the SCR component is unloaded. In an exemplary embodiment, unloading may take up to 30 minutes. After the reductant load has been depleted, dosing can be re-commenced to re-establish a known (i.e., reliably predictable by the reductant load model) load on the SCR component.

At 108, control activates an intrusive SCR test to achieve a predetermined temperature range for the SCR component. Control also turns dosing on at 108. At 112, control determines whether there is a sufficient reductant load on the SCR component 30. A time delay may be used to ensure that the sufficient reductant load has been re-established to provide acceptable NOx conversion.

If 112 is false, control waits until there is a sufficient reductant load on the SCR component. At 114, control determines whether a second set of enable conditions have been met. For example only, the second set of enable conditions may include one or more of the following conditions: exhaust stream flow rate within a predetermined range; upstream NOx mass flow within a predetermined range; upstream NOx concentration within a predetermined range and/or NOx sensors ready. Still other conditions may be included in the second set of enable conditions.

At 118, control measures an efficiency of the SCR conversion process (EFFSCR). At 120, control generates an efficiency of the SCR conversion process (EFFSCR) as a function of upstream and downstream accumulated masses. At 124, control generates an efficiency threshold (EFFTHR) as a function of upstream NOx and SCR component temperature. The efficiency threshold (EFFTHR) may be expressed as a percentage.

At 128, control determines whether EFFSCR is greater than or equal to EFFTHR. If 128 is true, control declares a reductant quality pass status (and/or SCR efficiency status) at 130. If 128 is false, control declares a reductant quality FAIL status (and/or an SCR efficiency FAIL status) at 132. Control continues from 130 with 134 and disables the reductant failure mode. For example, the vehicle speed limiting mode and/or other remedial measures are ended. Control continues from 132 and 134 with 140 where control ends intrusive exhaust stream temperature management and enables EGR (if previously disabled).

Figure 4:
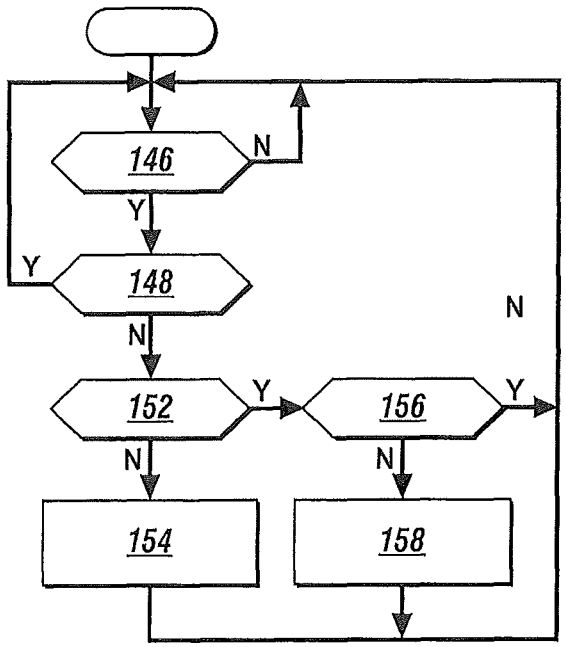
FIG. 4 illustrates a method for controlling the temperature of the SCR catalyst.

Referring now to FIG. 4, an intrusive exhaust stream temperature management method is shown. At 146, control determines whether the intrusive SCR test is running. If 146 is false, control returns to 146. If 146 is true, control continues at 148 where control determines whether the SCR temperature is within a predetermined temperature range (for example, between a minimum temperature TLo and a maximum temperature THi).

If 148 is true, control returns to 146. If 148 is false, control determines whether the SCR component temperature is greater than the minimum temperature TLo at 152. If 152 is false, control increases the exhaust stream temperature in any suitable manner. For example, the exhaust stream temperature can be increased by altering fueling (fuel quantity, fuel injection timing, post injection, etc.) and/or by starting or increasing HC injection at 154. Control returns to 146.

If 148 is false, control determines whether the SCR component temperature is less than the maximum temperature THi at 156. If 156 is false, control decreases the exhaust temperature in any suitable manner. For example, the exhaust temperature can be decreased by altering fueling (fuel quantity, fuel injection timing, post injection, etc.) and/or by stopping or decreasing HC injection at 158. Control returns to 146.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust diagnostic system comprising:
    a selective catalyst reduction (SCR) component testing module that executes an SCR component efficiency test comprising determining an efficiency of an SCR component relating to adjustment of one or more constituents of an exhaust stream flowing through the SCR component;
    an exhaust stream temperature management module that selectively adjusts a temperature of the SCR component to a predetermined temperature range using intrusive exhaust stream temperature management; and
    a test initiation module that executes a process for depleting a reductant load on the SCR component and subsequently initiates an SCR component efficiency test using the SCR component testing module after failing a prior SCR component efficiency test and while the temperature of the SCR component is within the predetermined temperature range.

2. An exhaust diagnostic system as in claim 1, wherein the SCR component testing module is configured to evaluate the efficiency of the SCR component after dosing the SCR component.

3. An exhaust diagnostic system as in claim 1, further comprising:
    a speed limiting module that limits a speed of a vehicle after the vehicle fails the prior SCR component efficiency test; and
    a reset module that resets the speed limiting module if the SCR component efficiency test is passed.

4. An exhaust diagnostic system as in claim 1, wherein the SCR component has a temperature in a first temperature range after failing the prior SCR component efficiency test, and wherein the first temperature range is lower than and distinct from the predetermined temperature range, and wherein the exhaust stream temperature management module increases fuel in the exhaust stream by at least one of:
    adjusting fueling; and
    injecting HC fuel into the exhaust stream using a HC injector to increase the temperature of the SCR component.

5. An exhaust diagnostic system as in claim 1, wherein the SCR component testing module includes a test enable module that selectively enables testing of an SCR efficiency when at least one of:
    particulate filter regeneration is not being performed; and
    adaptation control of the SCR component is not being performed.

6. An exhaust diagnostic system as in claim 1, further comprising:
    a temperature calculating module that calculates the temperature of the SCR component based on inlet and outlet temperatures of the SCR component; and
    a fuel adjustment module that at least one of adjusts fueling and injects hydrocarbon (HC) fuel in the exhaust stream to increase a temperature of the SCR component.

7. A method for diagnosing an exhaust system comprising:
    determining an efficiency of a selective catalyst reduction component (SCR component) relating to adjustment of one or more constituents of an exhaust stream flowing through the SCR component;
    selectively adjusting a temperature of the SCR component to a predetermined temperature range using intrusive exhaust stream temperature management; and
    executing a process for depleting a reductant load on the SCR component and initiating an SCR component efficiency test using an SCR efficiency module after failing a prior SCR component efficiency test and while the temperature of the SCR component is within the predetermined temperature range.

8. A method for diagnosing an exhaust system as in claim 7, further comprising testing the efficiency of the SCR component after adjusting dosing of the SCR component to a predetermined level.

9. A method for diagnosing an exhaust system as in claim 7, wherein:
    the SCR component has a temperature in a first temperature range after failing the prior SCR component efficiency test due to vehicle speed limiting; and
    the first temperature range is lower than and distinct from the predetermined temperature range.

10. A method for diagnosing an exhaust system as in claim 7, further comprising:
    increasing fuel in the exhaust stream to increase the temperature of the SCR component by at least one of:
    adjusting a flow of HC fuel to a combustion chamber contributing to the exhaust stream; and
    injecting a flow of HC fuel into the exhaust stream using a HC injector.

11. A method for diagnosing an exhaust system as in claim 7, further comprising selectively enabling testing of an SCR efficiency when at least one of:
    particulate filter regeneration is not being performed; and
    adaptation control of the SCR component is not being performed.

12. A method for diagnosing an exhaust system as in claim 7, further comprising:
    sensing an inlet temperature of the SCR component;
    sensing an outlet temperature of the SCR component; and
    calculating the temperature of the SCR component based on the inlet temperature of the SCR component and the outlet temperature of the SCR component.

13. A method for diagnosing an exhaust system as in claim 7, further comprising:
    calculating the temperature of the SCR component based on inlet and outlet temperatures of the SCR component; and
    at least one of:
    adjusting a flow of HC fuel to a combustion chamber contributing to the exhaust stream; and
    injecting a flow of HC fuel into the exhaust stream using a HC injector.

14. A method for diagnosing an exhaust system as in claim 7, further comprising disabling exhaust stream recirculation after completing the prior SCR component efficiency test and prior to initiating a subsequent the SCR component efficiency test.

15. A method for diagnosing an exhaust system as in claim 7, further comprising limiting a speed of a vehicle after the vehicle fails the prior SCR component efficiency test.

16. A method for diagnosing an exhaust system as in claim 15, further comprising removing a speed limit if the SCR component efficiency test is passed.

17. A method for diagnosing an exhaust system, the method comprising:

determining an efficiency of a selective catalyst reduction (SCR) component relating to adjustment of one or more constituents of an exhaust stream flowing through the SCR component;

selectively adjusting a temperature of the SCR component to a predetermined temperature range using intrusive exhaust stream temperature management;

establishing, after failing a prior SCR component efficiency test, a known reductant load on the SCR component by depleting a reductant load on the SCR component; and subsequently initiating an SCR component efficiency test using an SCR efficiency module.

18. The method of claim 17, wherein depleting the reductant load on the SCR comprises commanding dosing off of reductant until the reductant load on the SCR component is reduced to a level below a predetermined threshold.

19. The method of claim 18, further comprising confirming the reductant load on the SCR is reduced to a level below the predetermined threshold prior to initiating the SCR component efficiency test.

20. The method of claim 19, wherein the step of confirming the reductant load on the SCR comprises confirming the reductant load on the SCR is reduced to a level below the predetermined threshold by comparing signals from a first NOx sensor upstream of the SCR component and a second NOx sensor downstream of the SCR component.

* * * * *